June 2, 1970        T. J. McEWAN        3,515,339

PUNCHCARD READING APPARATUS

Filed Nov. 10, 1966        5 Sheets-Sheet 1

INVENTOR.
THOMAS JOSEPH McEWAN
BY Maybee & Legris
ATTORNEYS

June 2, 1970  T. J. McEWAN  3,515,339
PUNCHCARD READING APPARATUS
Filed Nov. 10, 1966  5 Sheets-Sheet 2
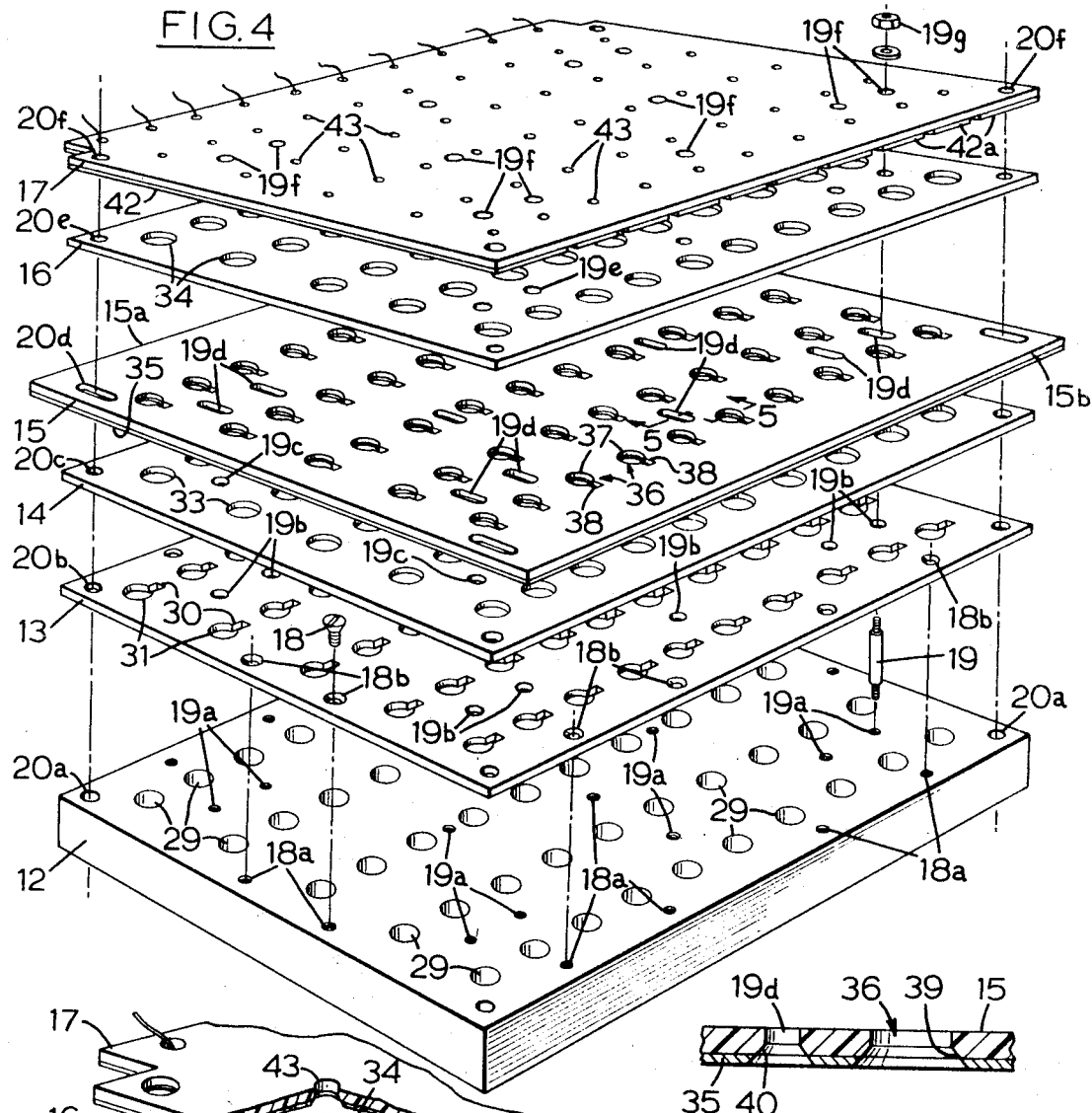
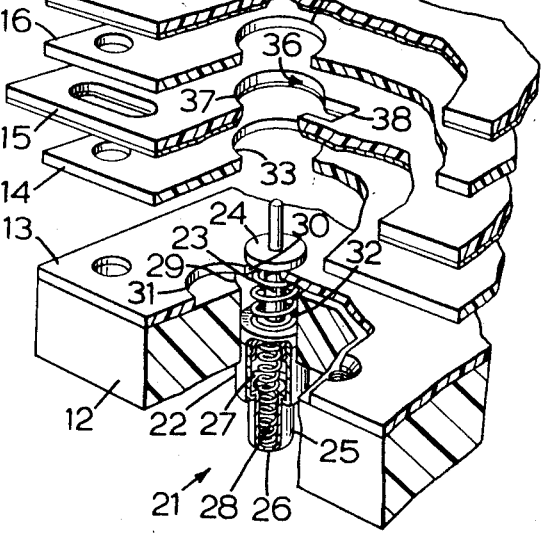
FIG. 3
FIG. 4
FIG. 5
INVENTOR.
THOMAS JOSEPH McEWAN
BY Maybee & Legris
ATTORNEYS June 2, 1970  T. J. McEWAN  3,515,339

PUNCHCARD READING APPARATUS

Filed Nov. 10, 1966  5 Sheets-Sheet 3

*INVENTOR.*
THOMAS JOSEPH McEWAN
BY *Maybee & Legris*
ATTORNEYS

June 2, 1970     T. J. McEWAN     3,515,339
PUNCHCARD READING APPARATUS

Filed Nov. 10, 1966     5 Sheets-Sheet 4

INVENTOR.
THOMAS JOSEPH McEWAN

BY *Maybee & Legris*
ATTORNEYS

June 2, 1970     T. J. McEWAN     3,515,339

PUNCHCARD READING APPARATUS

Filed Nov. 10, 1966     5 Sheets-Sheet 5

*INVENTOR.*
THOMAS JOSEPH McEWAN

BY *Maybee & Legris*

ATTORNEYS

United States Patent Office 3,515,339
Patented June 2, 1970

3,515,339
PUNCHCARD READING APPARATUS
Thomas Joseph McEwan, Apt. 14, 2125 Avenue Road,
Toronto 12, Ontario, Canada
Filed Nov. 10, 1966, Ser. No. 593,579
Claims priority, application Great Britain, Nov. 12, 1965,
48,259/65
Int. Cl. G06k 7/04, 5/04; G09b 7/00
U.S. Cl. 235—61.7                                    7 Claims

ABSTRACT OF THE DISCLOSURE

An apparatus for marking examination papers comprises a selector module including an array of sensing conductors and a terminal plate, the sensing conductors being arranged in groups and being selectively engageable with the terminal plate in accordance with a master record. A second module is adapted to co-operate with the selector module, the second module including a second terminal plate with which the sensing conductors are engageable through the record perforations. At least one of the terminal plates comprises a number of terminal strips insulated from one another, each group of sensing conductors being engageable with a respective terminal strip. The apparatus includes a potential source, and a stepping switch operable to connect sequentially the terminal strips of the one terminal plate in circuit with the potential source and the other terminal plate whereby to derive a separate electrical pulse for each item of data recorded on the master record.

---

This invention relates to apparatus for comparing with a master record items of data presented as perforations in a punchcard. The apparatus is designed for use with punchcards of the kind containing a number of items of data, which items are scanned electrically and compared with corresponding items in a master record stored in the apparatus.

Basically, the apparatus comprises a selector module including an array of sensing conductors and a terminal plate, the sensing conductors being arranged in groups and being selectively engageable with the termnial plate in accordance with the master record, and a second module adapted to co-operate with the selector module, the second module including a second terminal plate with which the sensing conductors are engageable through the card perforations, at least one of the terminal plates comprising a plurality of terminal strips insulated from one another, each group of sensing conductors being engageable with a respective terminal strip, a potential source, and a stopping switch operable to connect sequentially the terminal strips of the one terminal plate in circuit with the potential source and the other terminal plate whereby to derive a separate electrical pulse for each item of data recorded on the punchcard which agrees with a corresponding item of the master record. Provision may be made for connecting a pulse-operated digital counter to the apparatus for counting the electrical pulses.

An apparatus according to the invention is particularly suitable for marking examination papers, of the kind in which a pupil answers a group of questions by selecting on a special answer card, for each question, one choice from the several choices suggested in the examination paper or questionnaire. The prototype which is illustrated and described herein is designed to deal with ten questions, each question being supplied with five possible answers from which the pupil must select his choice; the principles of operation exemplified in the prototype can of course be embodied in an apparatus which will deal with any number of questions as well as with any number of possible choices of answers.

The apparatus is for use with "punchcard" type answer cards. For example, on a card is printed a set of fifty "pushout" circles arranged in a rectangular pattern of ten rows, each of five circles, each circle being identified to correspond with the questionnaire. Each row of five circles represents the five suggested choices for one answer, from which the pupil must make only one choice. He signifies his choices by removing the appropriate push-out circle in each of the rows, thus removing a total of ten circles to answer all ten questions.

An apparatus embodying the invention and designed for use with the card of the above example, includes a selector module in which an array of fifty sensing conductors or selector pins, (i.e. ten groups of five are positioned in a symmetrical arrangement which coincides with the arrangement of the push-out circles in the answer cards. Each sensing conductor or selector pin has a telescopic portion which can be preset into two distinct circuit-making positions, namely to an upper position where the pin is intended to represent a "correct choice" answer and to a lower position where the pin is intended to represent an "incorrect choice" answer. The selector module is used in conjunction with a second module having an electrically insulated terminal plate or soleplate in which are ten brass terminal strips, each strip being associated with the five possible choices for one answer.

In order to rate or check the answer card, it is positioned on the soleplate and the selector module then is brought into registration with the soleplate. Each perforation in the answer card, resulting from the removal of a push-out circle, allows the selector pin at the particular position to make electrical contact with one of the ten brass strips, each brass strip being associated with all five possible choices for one answer. Contact between a selector pin and a brass strip closes an electrical circuit; on the other hand, the absence of a perforation at a circle prevents the selector pin at that position from closing the circuit.

In the circuit is included a pulse-operated digital counter of known construction, in series with a stepping switch which is so arranged as to make contact individually and in the correct sequence with each one of the brass strips in the soleplate. Thus, the ten "correct choice" selector pins, which were preset at the upper position can each in turn complete the circuit through the pulse-operated digital counter, if the appropriate perforations were made by the pupil in the answer card.

The forty incorrect choice selector pins which were preset at the lower circuit-making position will cause the pulse-operated digital counter to complete the circuit through perforations which may have been made by the pupil at the incorrect positions on the answer card, to a low resistance shunt circuit which renders the high resistance digital counter inoperative. Thus, if the pupil in order to increase his chance of success should select more than one choice for each answer, each incorrect choice for that answer will complete the shunt circuit, thereby rendering the digital counter inoperative, even though one of his choices may have been correct; therefore the pupl's attempt to cheat will be foiled.

One embodiment of the invention will now be described by way of example with reference to the accompanying drawings, in which like reference characters indicate corresponding parts throughout the several views, and in which:

FIG. 3 is an enlarged exploded perspective view of a segment of the selector module, cut away to show the internal arrangement of the main components, namely a sensing conductor or selector pin, a selector block, a retaining plate, a locking plate interposed between two spacing plates and a terminal plate or scoring plate;

FIG. 4 is an exploded perspective view of the selector block, with some of its associated components;

FIG. 5 is a large scale cross-sectional view of a portion of the locking plate, taken through the line 5—5 of FIG. 4;

Figure 1:
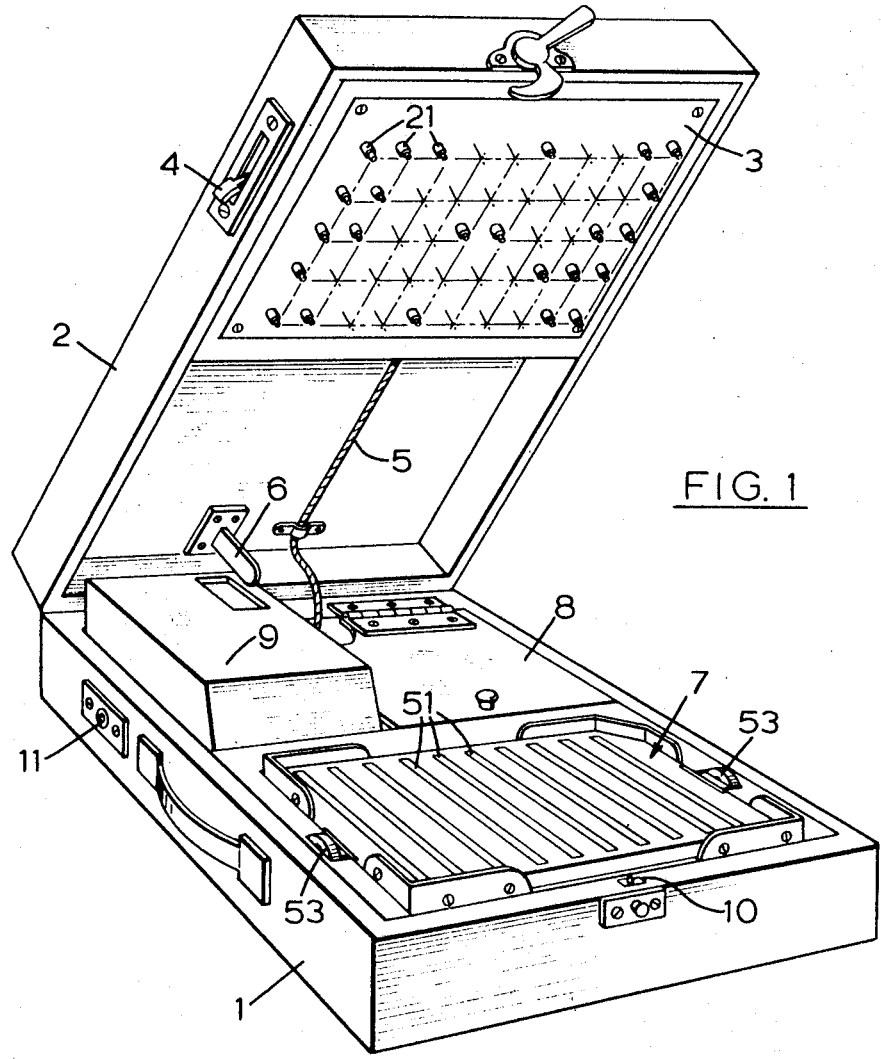
FIG. 1 is a perspective view of a fully assembled apparatus embodying the invention.
Figure 2:
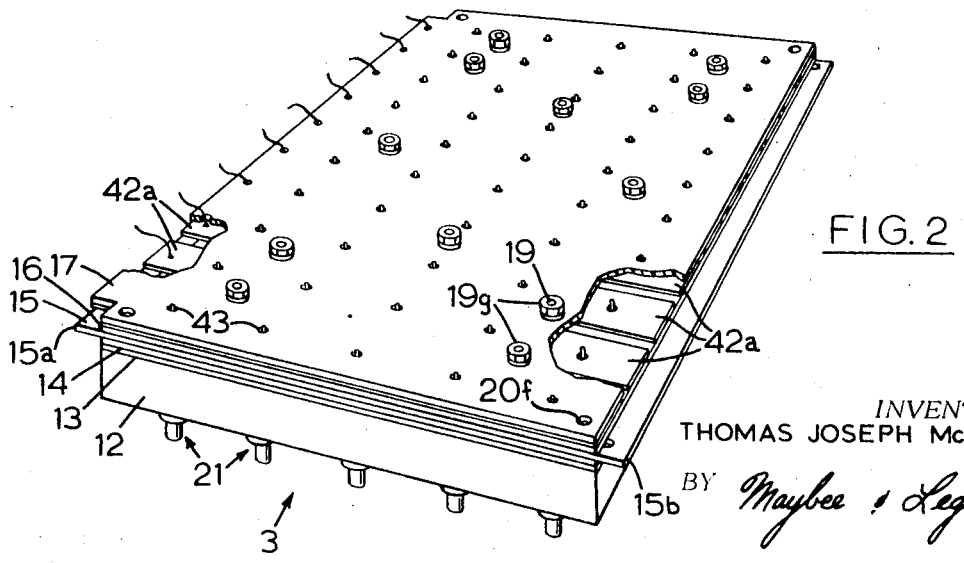
FIG. 2 is a perspective view of the selector module of the apparatus.

Referring to FIG. 1, the apparatus is built into a wooden case comprising two mutually hinged parts, namely a body 1 and a lid 2. In the lid are mounted the selector module 3, a programming lever 4, an electrical cable 5 and a cam 6. In the body is mounted a second module 7, with which the selector module is adapted to cooperate when the lid is closed, a potential source constituted by batteries (not shown) under a hinged flap 8, a stepping switch concealed under a cover 9, and a micro-switch 10. A low voltage pulse-operated digital counter (not shown) plugs into a socket 11 at the exterior of the case, the socket 11 providing terminal means by which the pulse counter is connected in circuit with the apparatus.

Referring particularly to FIGS. 1 and 5, the selector module 3 is a composite structure comprising the selector block 12 on which are stacked the retaining plate 13, a lower spacing plate 14, the slidable locking plate 15, an upper spacing plate 16 and a first terminal plate or scoring plate 17.

As will be described subsequently in greater detail, the retaining plate 13 bears directly on the selector block 12, and these two parts are firmly secured to each other by means of twelve screws 18 inserted in registering holes 18a and 18b which are symmetrically arranged adjacent the edges of the selector block and of the retaining plate, respectively; an additional two screws 18 are inserted in registering holes 18a and 18b which are provided in central areas of the selector block and of the retaining plate, respectively.

The slidable locking plate 15 which is interposed between the two spacing plates 14 and 16, and the scoring plate 17 which bears on the spacing plate 16 are held in assembled relationship by means of a set of twelve double-shouldered studs 19 having one end screwed into symmetrically arranged holes 19a in the selector block 12 and registering holes 19b in the retaining plate 13. The studs 19 also pass through registering holes 19c in the spacing plate 14, elongated registering holes 19d in the locking plate 15, registering holes in the spacing plate 16 and registering holes 19f in the scoring plate 17. The shoulder-to-shoulder length of the studs is so selected that when nuts 19g are screwed down and tightened they exert a correct pressure on the faces of the several stacked plates.

At each corner of the selector block 12 and of the five plates 13, 14, 15, 16 and 17 which together with the selector block constitute the selector module 3, are registering holes, 20a, 20b, 20c, 30d, 20e and 20f through which screws may be inserted for mounting the selector module in the lid 2 of the case.

Referring particularly to FIG. 3, a sensing conductor or selector pin generally indicated at 21 comprises a hollow cylindrical barrel 22 which preferably is made of brass and which has a slender, rearwardly extending, coaxially arranged, stem 23. On the stem 23 is provided a shoulder 24 spaced a predetermined distance from the top of the barrel 22. Mounted for telescopic movement in the barrel 22 and normally projecting therefrom is a forwardly extending hollow tip 25 having a closed convex end 26 and another end 27 which is beaded so as to prevent escape of the tip 25 from the cylinder 22. The tip 25 normally is urged outwardly by a compression spring 28; the tip can be telescoped into the barrel against the force of the spring 28.

The selector block 12 (see FIG. 4) which is made of an electrically insulating hard synthetic resin, provides the base of the selector module 3. The selector block is drilled through with a set of fifty holes 29 arranged symmetrically to form ten rows each of five holes. Each of the fifty holes accommodates a selector pin 21 with a sliding fit.

The retaining plate 13 (see FIG. 4) preferably is made of a phenolic resin laminate, and it is of the same shape and area as the top of the selector block 12. The retaining plate is pierced by a set of fifty keyholes, comprising slots 30 and enlarged ends 31. The positions of the slots 30 correspond to the positions of the fifty holes 29 in the selector block 12. The slots are parallel to the longer sides of the retaining plate, and viewed relative to their enlarged ends they all point in the same sense. The only purpose of the enlarged ends 31 is to enable assembly of the selector pins in association with the retaining plate prior to the latter being secured by means of the screws 18 to the selector block 12.

The fifty selector pins 21 are assembled or associated with the retaining plate 13 before the retaining plate is secured to the selector block 12. The procedure is as follows for each of the fifty pins. A helical spring 32 of a diameter slightly larger than the diameter of the shoulder 24 is positioned around the stem 23 so that it bears on the top of the barrel 22. The helical spring 32 must be lighter or weaker than the coil-spring 28 which is inside of the selector pin. The stem 23 of the selector pin with the coil-spring 32 thereon is introduced from the underside of the retaining plate through the enlarged end 31 of a keyhole, and is then moved bodily sidewards so that the stem enters the slot 30 of the keyhole, with the shoulder 24 of the stem positioned above the retaining plate 13 and the spring 32 compressed between the top of the barrel 22 and the underneath surface of the retaining plate 13. The selector pin then is released; it is prevented from becoming disengaged relative to the retaining plate 13 by the shoulder 24.

The procedure described above is repeated for the remainder of the fifty selector pins 21, each in its own respective keyhole 30. The tips 25 and the barrels 22 of the fifty selector pins then are introduced into the respective holes 29 in the selector block 12, and the retaining plate 13 finally is secured to the selector block by means of the screws 18. It will be evident that after the retaining plate, the selector pins and the selector block are assembled, the enlarged ends 31 of the keyholes 30 have no function.

The two spacing plates 14 and 16 are identical, each being of smooth plastic and of the same shape and size as the retaining plate 13. Each of the spacing plates is slightly thicker than the thickness of the shoulders 24 of the selector pins. Fifty holes 33 and 34 are provided in the spacing plates 14 and 16, respectively; these holes are positioned to be in registration with the holes 29 in the selector block 12, and they are of such a diameter that the selector pin shoulders 24 can be moved up and down without touching the edges of the holes.

The locking plate 15 is a printed circuitboard having a conductive undersurface provided by an unetched copper facing on one side as shown at 35. This conductive undersurface constitutes an additional terminal plate of the selector module. The locking plate is of the same length as the other plates of the stacked assembly but is slightly broader, and therefore it protrudes at opposite edges 15a and 15b from the longer sides of the selector module 3. The four corner holes 20d in the locking plate as well as the twelve holes 19d through which pass the studs 19 are elongated, thus to permit limited sliding movement of the locking plate between the two spacing plates 14 and 16.

The locking plate is pierced with a set of fifty keyhole perforations 36, each corresponding with the location of a selector pin 21. Each keyhole perforation consists of a circular portion 37 which is large enough to permit the passage of the shoulder 24 of a selector pin, and a slot 38 parallel to the shorter side of the locking plate and oriented in the same sense as the elongated holes 19d and 20d.

In order to prevent electrical contact between the copper facing 35 of the locking plate and the stems 23 of the selector pins on the one hand, and between the copper facing 35 and the studs 19 on the other hand, the edges of the keyhole slots 38 and of the holes 19d are bevelled, as indicated at 39 and 40, respectively, in FIG. 5. Although the stems 23 of the selector pins cannot contact the copper facing 35, nevertheless the shoulders 24 are broad enough to bridge the bevelling at 39 and to make electrical contact with the copper facing 35 as required during use of the apparatus, as will be explained subsequently.

Referring again to FIG. 4, the first terminal plate or scoring plate 17 is a printed circuit board having a copper facing 42 on its underside. It is drilled with fifty holes 43 which are so located as to allow each to accommodate the tip of the stem 23 of a selector pin 21 when assembled in the selector module 3, allowing the stems sufficient clearance to slide freely up and down. Bevelling around the edges of the holes 43 and of the holes 19f, respectively, prevents electrical contact between the copper facing 42 of the scoring plate and the studs 19 on the one hand, and between the copper facing 42 and the stems 23 of the selector pins. However, the shoulders 24 of the selector pins are broad enough to bridge the bevelling around the holes 43, thus to contact the copper facing, as required during use of the apparatus.

The copper facing of the scoring plate is etched into ten individual terminal strips or scoring strips, some of which are indicated at 42a, each scoring strip containing a row of five holes 43.

Figure 6:
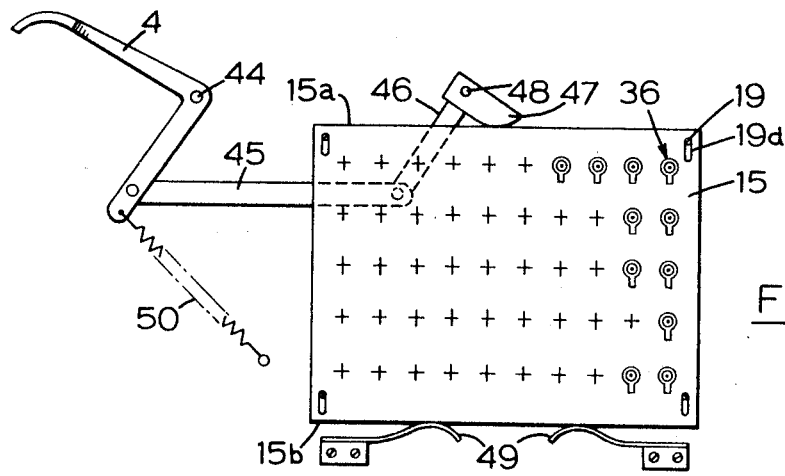
FIG. 6 is a schematic view of the programming mechanism, showing the positions of the parts when the programming lever is at the LOCK position.
Figure 7:
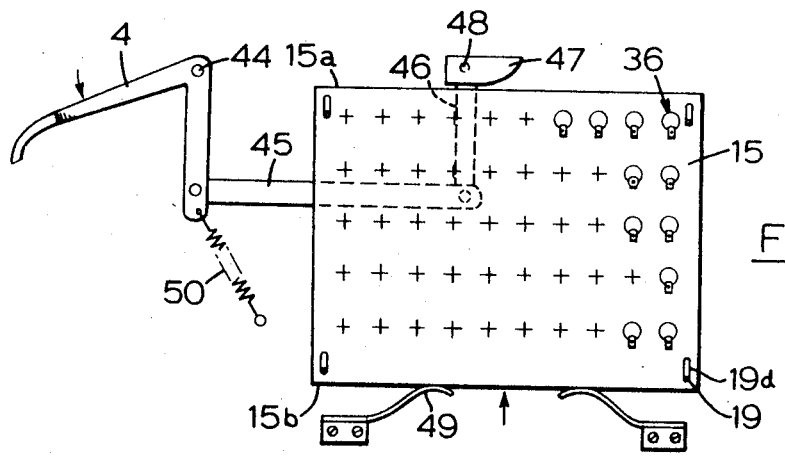
FIG. 7 is a schematic view of the programming mechanism, showing the positions of the parts when the programming lever is at the RELEASE position.

FIGS. 6 and 7 are schematic views which illustrate primarily how the locking plate 15 is moved into two different positions by the programming lever 4 during the "programming" operation. In these two figures the locking plates 15 is shown with only one row of keyholes 36 although there are ten such rows; also, only four of the slots 19d and of the pillars 19 are shown. The programming lever is one arm of a bell crank which pivots on a fixed pin 44. The bell crank provides with a link 45 and a lever 46 a simple articulated linkage system to effect and to control the rocking of a cam 47 about a fixed pin 48. The working face of the cam 47 is adjacent to the edge 15a of the locking plate 15 which protrudes from the selector module 3. Two leaf springs 49 which are suitably secured to the lid 2 of the apparatus bear against the opposite protruding edge 15b.

The programming lever 4 is shown in FIG. 7 in its normal or "LOCK" position, to which it always is urged by a tension spring illustrated diagrammatically at 50. If the programming lever 4 be moved manually to the "RELEASE" position of FIG. 6, then the linkage constituted by the link 45 and the lever 46 will rotate the cam 47 clockwise, and the face of the cam by bearing on the edge 15a of the locking plate 15 will displace the locking plate transversely, this displacement being guided by the studs 19 in the slots 19d. The deformation of the leaf springs 49 resulting from the displacement of the locking plate 15 causes the leaf springs to urge the locking plate back to the normal "LOCK" position of FIG. 7.

Figure 8:
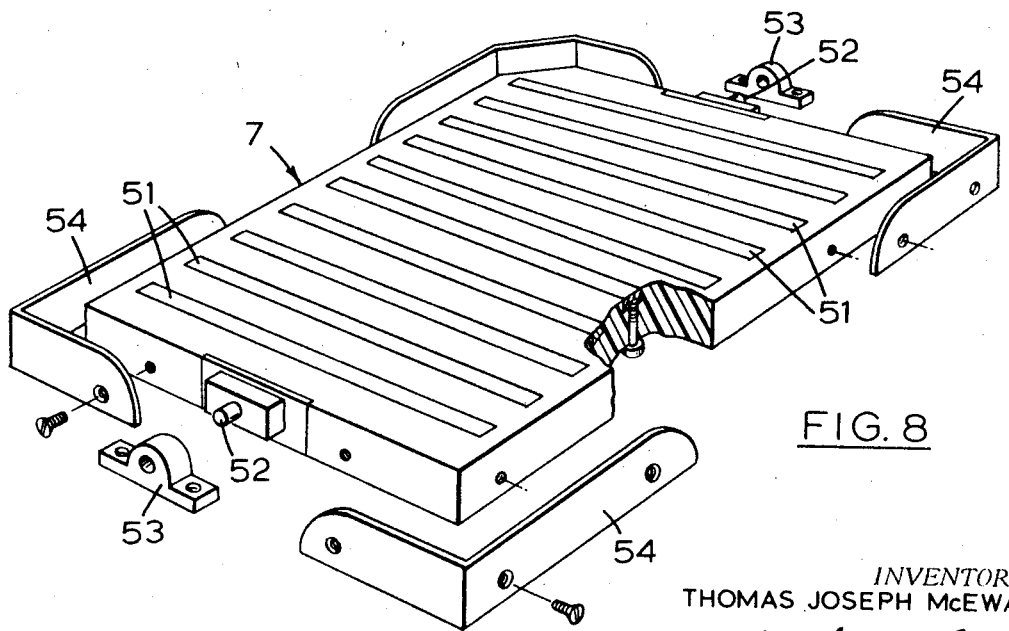
FIG. 8 is an exploded perspective view of the terminal plate or soleplate or the second module.

Referring particularly to FIGS. 1 and 8, the second module 7 comprises a thick rectangular block of hard plastic, of substantially the same shape and area as the face of the selector module 3. Inserted into the upper face of the second module are ten brass terminal strips 51, which correspond in position to the ten rows of selector pins 21 in the selector module 3. When the apparatus is put into use by closing the lid 2 relative to the body 1, the tips 25 of the selector pins 21 contact the appropriate brass strips 51 of the second module 7.

At opposite ends of the second module 7 are provided coaxial trunnions 52 which are journalled in bushes 53 secured to the body 1 of the case. This type of mounting allows the second module to adjust itself, by rocking, to provide equal loads on the tips 25 of all the selector pins when the apparatus is closed. A raised metal rim 54 at each corner of the second module is provided to locate properly an answer card which is placed on it.

Figure 9:
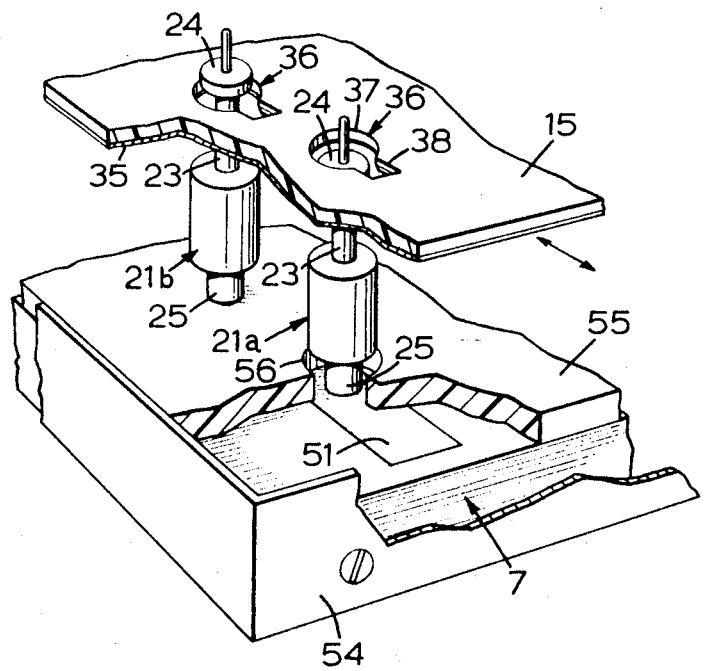
FIG. 9 is an enlarged scale cut away fragmentary perspective view of the apparatus, showing the components which are involved in presetting the apparatus for use.

FIG. 9 is an enlarged scale cut away fragmentary perspective view of the apparatus, showing the components which are involved in presetting the apparatus for use, and showing particularly the cooperation of the locking plate 15, of two specific selector pins 21a and 21b, of a master stencil 55 and of the second module 7. FIG. 9 has been simplified by eliminating components which are not essential for the particular explanation.

A master stencil has to be prepared for each examination paper by incorporating in it the apropriate perforation pattern. Ten positions in the stencil represent "correct" answers whereas the remaining forty positions represent "incorrect" answers. The master stencil is perforated at the locations corresponding to the forty incorrect answers, and it remains imperforate at the ten locations corresponding to the correct answers.

A master stencil 55 which has been prepared previously is positioned on the second module 7 and the lid 2 then is closed, thus superimposing the tips 25 of the representative selector pins 21a and 21b on the master stencil. In the example which is illustrated, there is a perforation 56 opposite pin 21a, while the area of the stencil opposite the pin 21b remains imperforate, to represent a correct answer.

Before the operator closes the lid 2 he moves the locking plate 15 to the "RELEASE" position by lifting the programming lever 4, thus enabling the shoulders 24 of the selector pins 21 to pass through the enlarged portions 37 of the keyholes 36. Since the selector pin 21b registers at its lower extremity with an imperforate area of the master stencil 55, the shoulder 24 of this selector pin will have been moved to an upper position above the plane of the locking plate 15. On the other hand, since the lower extremity of the selector pin 21a registers with the perforation 56 in the master stencil, the shoulder 24 of the said selector pin will remain in a lower position below the plane of the locking plate 15.

The locking plate 15 is now returned to its normal "LOCK" position by releasing the programming lever 4. This operation shifts the locking plate so that the stems 23 of the selector pins 21 come into registration with the slots 38 of the keyholes 36. With the stems 23 thus positioned, the shoulders 24 are locked, the shoulder of the pin 21a being below the plane of the locking plate, and the shoulder of the pin 21b being above it. It will be evident that when the apparatus is programmed, ten selector pins representing "correct" answers are preset in the upper position as typified by pin 21b, and all of the remaining forty selector pins which represent "incorrect" answers are positioned in the lower position as typified by pin 21a. After the apparatus has been programmed and the programming lever 4 has been released, the master stencil is removed and the apparatus is ready for use.

Figure 10:
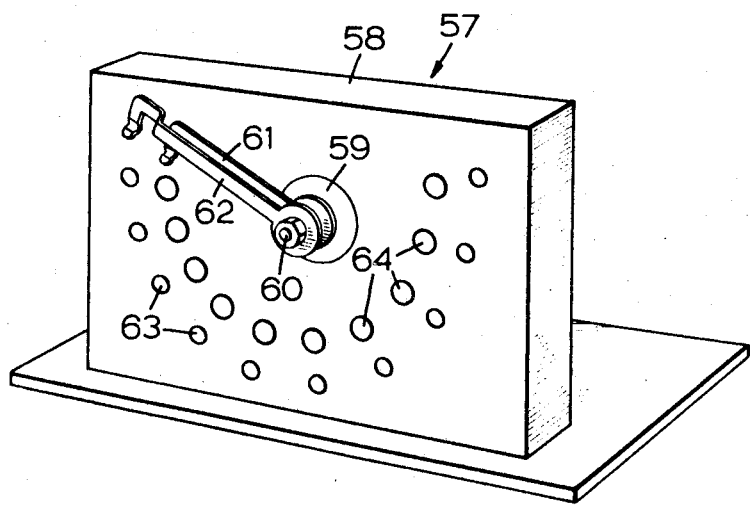
FIG. 10 is a perspective view of an elementary stepping switch which conveniently may be used with the apparatus of the invention.

In order to be checked or rated, an answer card is placed on the second module 7 and the cover 2 is closed. The card is scanned electrically by means of a double banked stepping switch 57 of known construction, illustrated in FIG. 10. Essentially the stepping switch consists of a block of insulating material 58 drilled at its centre to receive a brass bush 59 in which a shaft 60 rotates. The shaft carries two scanning arms 61 and 62 mounted coaxially and coradially and electrically insulated from each other, the arm 62 being longer than the arm 61. The tip of the longer arm 62 sweeps an outer series of studs 63 which extend through the plastic block with their rear extremities emerging at the rear face of the block. The tip of the shorter arm 61 sweeps an inner series of studs 64 which also extend through the plastic block with their rear extremities emerging at the rear face of the block. The studs 64 of the inner series are of greater diameter than the studs 63 of the outer series, and therefore contact with them by the cooperating arm 61 is established first and is held longer than contact by the arm 62 with the studs 63 of the outer series. The purpose of this arrangement will be explained fully with reference to FIG. 13.

The stepping switch may be rotated by any suitable means, so long as provision is made to ensure that the sweep action always begins at the same pair of studs 63 and 64 and always proceeds in the same sense, namely counter-clockwise in the example illustrated. The stepping switch must be so constructed that its scanning action can commence only after the apparatus has been closed and the selector pin tips 25 all contact the terminal strips 51 of the second module or the interposed answer card. As an example, the stepping switch may be loaded mechanically by the action of the lever-operated cam 6 as the lid is being closed and then it is latched; the switch is unlatched through the action of the micro-switch 9 which completes a circuit to a solenoid-actuated unlatching device when the lid is in fully closed position, thus causing the stepping switch to perform its scanning cycle.

Figure 11:
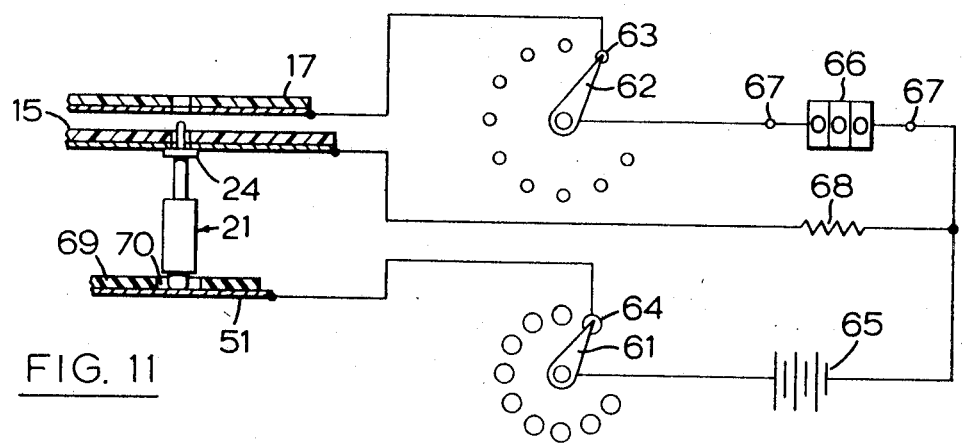
FIG. 11 is a schematic view of the components which form part of the electric circuit, showing how the circuit is completed when an incorrect choice has been made.
Figure 12:
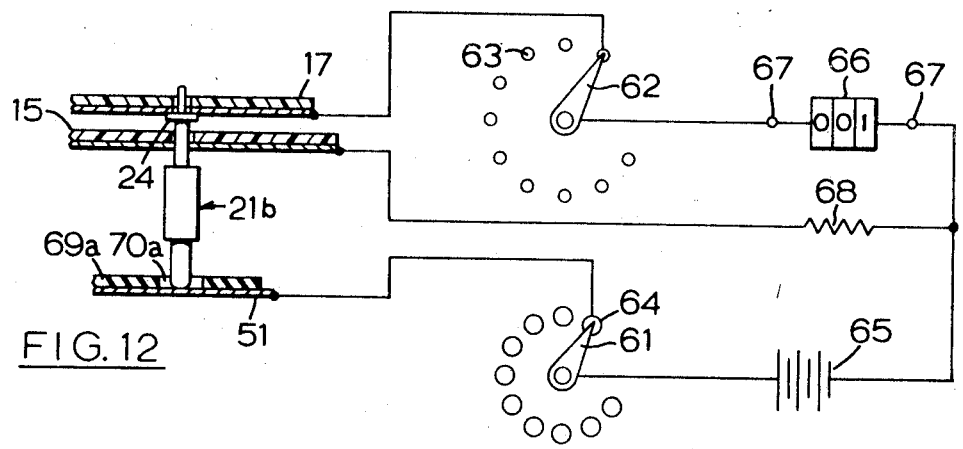
FIG. 12 is a schematic view of the components which form part of the electric circuit, showing how the circuit is completed when a correct choice has been made.
Figure 13:
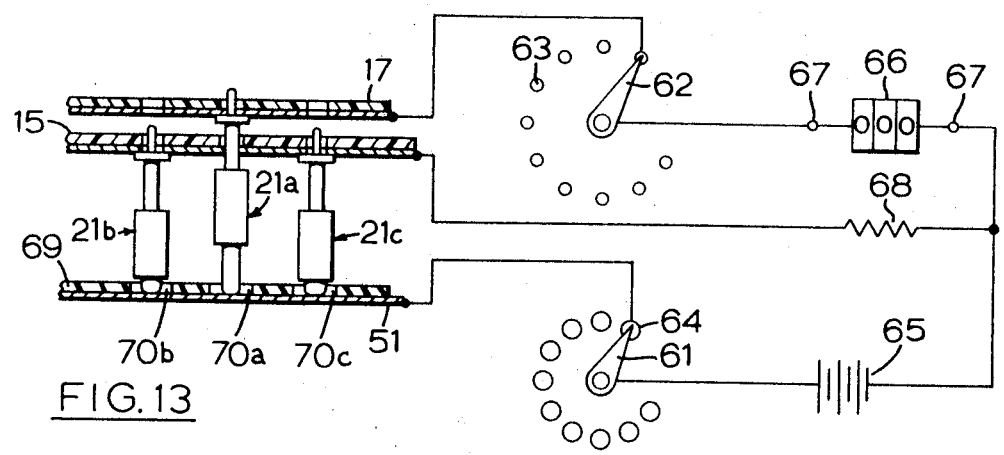
FIG. 13 is a schematic view of the components which form part of the electric circuit, showing how the circuit is completed when a pupil attempts to cheat by selecting more than one answer to a question.

The electrical circuit of the apparatus is illustrated in FIGS. 11, 12 and 13. Each of the terminal strips 51 in the second module 7 is connected to its respective stud 64 in the stepping switch. The circuit includes the scanning arm 61 connected to a potential source or battery 65 in series with a pulse-operated digital counter 66 and with the arm 62 of the stepping switch. The digital counter is connected in the circuit by terminals 67 of the socket 11 (FIG. 1). The circuit also includes the contact studs 63 which are connected respectively to the ten individual strips of the scoring plate 17. As is illustrated in FIG. 12, the circuit may be completed by a selector pin 21 which through its shoulder 24 contacts an individual strip of the scoring plate 17. Alternatively, as is illustrated in FIG. 11, when the shoulder 24 of a selector pin 21 contacts additional terminal plate of the selector module, i.e. the copper facing of the locking plate 15, the circuit is completed through a resistor 68 connected as a shunt relative to the digital counter 66, and thus the digital counter effectively is bypassed.

FIG. 11 illustrates the electrical circuit which is completed by the apparatus when it rates an answer card containing an incorrect choice. The lid 2 of the apparatus has been closed after an answer card 69, perforated in an incorrect position at 70 has been positioned on the soleplate. The perforation 70 coincides with the position of a selected pin 21 which previously had been set in the lower position to represent an incorrect answer. As the stepping switch arms 61 and 62 rotate counter-clockwise simultaneously, the shorter arm 61 will sweep across the stud 64 and the circuit will be completed through a terminal strip 51, the additional terminal plate of the selector module 3, the resistor 68 and the potential source 65. Since the shoulder 24 of the selector pin 21 is not contacting the scoring plate 17, no current flows to the pulse operated digital counter 66, and no mark is recorded.

Presumably, the pupil would have refrained from perforating the answer card at the other four possible locations. Therefore, the four imperforate positions of the answer card will be interposed between the terminal strip 51 and the tip of the selector pin 21, and consequently no current can flow to the digital counter through this path. Thus the absence of a correct choice results in no mark being recorded by the digital counter.

FIG. 12 illustrates the electrical circuit which is completed by the apparatus when it takes an answer card containing a correct choice. In this instance, the perforations 70a in the answer card 69a coincides with the position of a selector pin 21b preset in the upper position (as was the selector pin 21b referred to in the description at FIG. 9). All selector pins preset in the upper position represent correct choices in the pupil's answers. As the stepping switch scanning arms 61 and 62 rotate simultaneously counter-clockwise, a circuit will be completed through the digital counter 66, which will register a mark for the correct choice of answer; the resistor 68 is ineffective in this instance since it is by-passed.

FIG. 13 is a schematic circuit diagram which illustrates a case in which a pupil in an attempt to increase his chances of success has cheated by selecting more than one choice in his answer. He has made three choices by perforating the correct hole 70a in his answer card and by perforating incorrect holes 70b and 70c. The correct choice selector pin 21a was preset to the upper position thus contacting a terminal strip of the terminal plate 17, while the incorrect choice selector pins 21b and 21c were preset to the lower position thus contacting the additional terminal plate constituted by the copper facing of the locking plate 15. Examination of FIG. 13 indicates that the circuit is completed through the resistor 68 as well as through the digital counter 66. Thus the counter receives only a very weak current and will not operate, and therefore no mark is recorded for the answer despite the fact that one of the three answers which the pupil gave was correct. Thus the pupil has gained no advantage by his attempt to cheat.

It must be noted here that since the studs 64 of the inner series are larger than the studs 63 of the outer series, during rotation the scanning arm 61 will contact each larger stud before the scanning arm 62 contacts each corresponding smaller stud 63; furthermore, each contact made by the scanning arm 61 will be of longer duration than a contact made by the scanning arm 62. This arrangement ensures that the incorrect choice perforations, coinciding with the positions of the selector pins 21b and 21c will complete the low resistance circuit through the resistor 68 before the correct choice perforation coinciding with the position of the selector pin 21a completes the high resistance circuit through the digital counter 66. Moreover, the low-resistance shunt circuit through resistor 68 will remain in operation until the high-resistance circuit through the digital counter 66 has been broken. This earlier completion and later breaking of the low-resistance circuit, which is connected as a shunt to the high resistance counter, precludes any possibility of a full strength pulse being sent through the correct choice selector pin 21a to the digital counter and thus operating it, as might easily happen if contact with both the inner and the outer series of studs were arranged virtually simultaneously.

What I claim as my invention is:

1. Apparatus for comparing with a master record items of data presented as perforations in a punchcard, comprising a selector module including an array of sensing conductors and a first terminal plate, the sensing conductors being arranged in groups and being selectively engageable with the terminal plate in accordance with the master record, a second module cooperable with the selector module, the second module including a second terminal plate with which the sensing conductors are engageable through the card perforations, at least one of the terminal plates comprising a plurality of terminal strips insulated from one another, each group of sensing conductors being engageable with a respective terminal strip, a potential source, and a stepping switch operable to connect sequentially the terminal strips of the one terminal plate in circuit with the potential source and the other terminal plate whereby to derive a separate electrical pulse for each item of data recorded on the punchcard which agrees with a corresponding item on the master record, said apparatus including terminal means for connecting a pulse operated digital counter in circuit with the stepping switch and the potential source, and the selector module includes an additional terminal plate, which terminal plate is insulated from the first terminal plate, the individual sensing conductors being engageable with the first terminal plate and the additional terminal plate selectively, and low resistance circuit means connected between the additional terminal plate and the potential source in shunt with said terminal means whereby to by-pass the pulse operated digital counter for any group in which a sensing conductor engages both the additional terminal plate and the second terminal plate through a card perforation.

2. Apparatus according to claim 1, wherein the selector module includes a releasable locking device having a first, unlocking position at which it permits free movement of the individual sensing conductors into selective engagement with the first terminal plate and the additional terminal plate, and a second, locking position at which it locks the sensing conductors in their respective engaged positions.

3. Apparatus according to claim 2, wherein the selector module comprises a perforate insulating block on which are assembled in registering stacked relation a perforate retaining plate, a perforate first insulating spacer, a perforate locking plate constituting said locking device, the locking plate having a conductive undersurface constituting said additional terminal plate, a perforate second insulating spacer, and said first terminal plate, the sensing conductors comprising spring-loaded pins which are axially displaceable within the perforations of the stacked assembly, each pin having a spring-loaded telescopic forward extension and a rearwardly extending stem, the forward extension being engageable with said second terminal plate and the rearwardly extending stem being engageable with the first terminal plate and the additional terminal plate alternatively.

4. Apparatus according to claim 3, including spring means for biasing the locking plate into its first, unlocking position, and a lever-operated cam for urging the locking plate against its spring bias into the second, locking position, the rearwardly extending stem of each sensing conductor being provided with a shoulder, and the locking plate being formed with an array of keyhole perforations through which the stems of said sensing conductors extend, each perforation comprising a circular portion through which a respective shoulder can pass when the locking plate is in its first position, and a slot which engages the shoulder when the locking plate is in its second position.

5. Apparatus according to claim 1, which apparatus is housed in a case comprising two mutually hinged parts, the selector module being mounted in one part and the second module being mounted in the other part, said modules being brought into cooperative engagement by closing of the case.

6. Apparatus for comparing with a master record items of data presented as perforations in a punchcard, comprising a selector module including a plurality of groups of sensing conductors, a first set of terminal strips with which the groups of sensing conductors are respectively engageable, and a terminal plate, the sensing conductors being alternatively engageable with the terminal strips and the terminal plate and being selectively engageable with the terminal strips in accordance with the master record, a second module cooperating with the selector module, said second module including a second set of terminal strips with which the groups of sensing conductors are respectively engageable through the card perforations, a potential source, a pulse operated digital counter, scanning means comprising a double banked stepping switch operable to connect sequentially respective pairs of terminal strips of said first and second sets in series with the potential source and the digital counter, and low resistance circuit means connected between said terminal plate and the potential source in shunt with the digital counter, the double banked stepping switch comprising a first bank of contact studs connected respectively to the terminal strips of the first set, a second bank of contact studs connected respectively to the terminal strips of the second set, and first and second scanning arms connected to the digital counter and potential source, respectively, the scanning arms being coupled for synchronous operation and the contact studs of the second set providing a larger contact area than the contact studs of the first set.

7. Apparatus according to claim 6, which apparatus is housed in a case comprising two mutually hinged parts, the selector module being mounted in one part and the second module being mounted in the other part, said modules being brought into cooperative engagement by closing of the case.

References Cited

UNITED STATES PATENTS

| | | | |
|---|---|---|---|
| 1,997,178 | 4/1935 | Johnson | 235—61.603 |
| 2,041,758 | 5/1936 | Harding | 235—61.603 |
| 2,052,442 | 8/1936 | Black | 235—61.603 |
| 2,113,620 | 4/1938 | Johnson | 235—61.603 |
| 2,275,590 | 3/1942 | Johnson | 235—61.603 |
| 3,166,647 | 1/1965 | Bean et al. | 235—61.11 X |
| 3,191,007 | 6/1965 | Mixer | 235—61.113 |
| 3,200,240 | 8/1965 | Hammel | 235—61.111 |
| 3,267,260 | 8/1965 | Baker et al. | 235—61.113 |

DARYL W. COOK, Primary Examiner

R. M. KILGORE, Assistant Examiner

U.S. Cl. X.R.

35—48; 73—156; 200—46; 235—61.6, 61.11